(12) United States Patent
Burgi et al.

(10) Patent No.: US 7,672,506 B2
(45) Date of Patent: Mar. 2, 2010

(54) SYSTEM FOR SPATIAL ANALYSIS OF A PHYSICAL QUANTITY

(75) Inventors: Pierre-Yves Burgi, Geneva (CH); Francois Kaess, Eclepens (CH); Pierre-Francois Ruedi, Hauterive (CH); Pascal Nussbaum, Cortaillod (CH)

(73) Assignee: CSEM Centre Suisse d'Electronique et de Microtechnique SA - Recherche et Developpement, Neuchatel (CH)

( * ) Notice: Subject to any disclaimer, the term of this patent is extended or adjusted under 35 U.S.C. 154(b) by 1350 days.

(21) Appl. No.: 10/532,090

(22) PCT Filed: Oct. 22, 2003

(86) PCT No.: PCT/EP03/11809

§ 371 (c)(1),
(2), (4) Date: Apr. 21, 2005

(87) PCT Pub. No.: WO2004/038337

PCT Pub. Date: May 6, 2004

(65) Prior Publication Data

US 2006/0034347 A1    Feb. 16, 2006

(30) Foreign Application Priority Data

Oct. 24, 2002    (FR) .................................. 02 13312

(51) Int. Cl.
*G06K 9/62* (2006.01)
(52) U.S. Cl. .................................................... 382/156
(58) Field of Classification Search .................. 382/156
See application file for complete search history.

(56) References Cited

U.S. PATENT DOCUMENTS

| | | | | |
|---|---|---|---|---|
| 3,246,302 A | * | 4/1966 | Martin et al. ................. | 706/38 |
| 3,462,547 A | * | 8/1969 | Macovski .................... | 348/571 |
| 3,564,498 A | * | 2/1971 | Stern .......................... | 382/205 |
| 3,568,075 A | * | 3/1971 | Dusheck et al. .............. | 327/96 |

(Continued)

FOREIGN PATENT DOCUMENTS

| EP | 0 961 207 A1 | 12/1999 |
|---|---|---|
| EP | 1 150 250 A1 | 10/2001 |

OTHER PUBLICATIONS

Mortara, A., et al., "A Communication Scheme for Analog VLSI Perceptive Systems", IEEE Journal of Solid-State Circuits, No. 6, Jun. 6, 1995, pp. 660-669.

*Primary Examiner*—Wenpeng Chen
(74) *Attorney, Agent, or Firm*—Jacobson Holman PLLC

(57) ABSTRACT

A system is provided in which the spatial values (S1 to Sn) of the physical quantity are represented by measurement pulses (I1 to In), the temporal ordering of which represents the values, which are processed by processing units (U1 to Un) arranged in at least one row and each include an output (SOR1 to SORn). During successive processing cycles, a measurement pulse processed therein can be delivered to form the output signal (SU) of the system. Each processing unit includes an inhibiting unit (BI) for, in other units and during a given processing cycle, inhibiting the passage to the outputs of the other units respective measurement pulses processed therein and hence preventing them from forming the output signal, if the measurement impulses are temporally ordered later in the given processing cycle than the one processed in the unit concerned.

13 Claims, 3 Drawing Sheets

U.S. PATENT DOCUMENTS

| | | | |
|---|---|---|---|
| 3,579,191 A * | 5/1971 | Andreae et al. | 709/238 |
| 4,228,395 A * | 10/1980 | Dusheck et al. | 324/76.24 |
| 4,380,046 A * | 4/1983 | Frosch et al. | 712/22 |
| 5,052,043 A * | 9/1991 | Gaborski | 382/157 |
| 5,136,687 A * | 8/1992 | Edelman et al. | 706/20 |
| 5,311,601 A * | 5/1994 | Carpenter et al. | 382/158 |
| 5,500,905 A * | 3/1996 | Martin et al. | 382/157 |
| 5,528,700 A * | 6/1996 | Takatori et al. | 382/157 |
| 5,912,986 A * | 6/1999 | Shustorovich | 382/156 |
| 5,978,025 A * | 11/1999 | Tomasini et al. | 348/302 |
| 6,185,667 B1 * | 2/2001 | Abercrombie et al. | 712/11 |
| 6,560,582 B1 * | 5/2003 | Woodall | 706/15 |
| 6,567,485 B1 | 5/2003 | Venier | 375/356 |
| 6,690,019 B2 * | 2/2004 | Stettner et al. | 250/370.08 |
| 6,694,049 B1 * | 2/2004 | Woodall | 382/159 |
| 7,013,027 B2 * | 3/2006 | Burgi et al. | 382/107 |
| 2002/0054694 A1 * | 5/2002 | Vachtsevanos et al. | 382/111 |
| 2002/0168100 A1 * | 11/2002 | Woodall | 382/156 |

* cited by examiner

SYSTEM FOR SPATIAL ANALYSIS OF A PHYSICAL QUANTITY

This is a nationalization of PCT/EP03/011809 filed Oct. 22, 2003 and published in French.

BACKGROUND OF THE INVENTION

1. Field of the Invention

The present invention relates to a system for spatial analysis of a physical quantity whose spatial values are represented by respective measurement pulses whose order in time is representative of those values.

To be more precise, the invention concerns the analysis of information represented by analog signals produced by the cells of a sensor responsive to the local evolution of the physical quantity in a given space.

2. Description of the Related Art

In the context of the technology evoked briefly hereinabove, it is already known in the art, in order to reduce the quantity of information from a sensor of this kind and thus to simplify its analysis, to submit the signals generated by the cells of the sensor to a process of ordering in time by means of turning filters. This method classifies the information obtained by creating pulses whose position in time reflects the pertinence of the information; the pulses arriving earliest code the most pertinent information.

A particularly interesting application of this time order concept can be found in the domain of character recognition in which the stream of analog signals is produced by a series of photosensitive "pixels", for example, each pixel forming one of the cells of the sensor. It has been shown that in this case recognition can be effected using only a small proportion of the information contained in the image captured by the sensor. The processing of the information can be simplified in this way, and the power consumption of the circuits of the sensor reduced accordingly.

However, it will be noted that this concept may be applied whenever an observed phenomenon is reflected in the spatial evolution of a physical quantity, which evolution is represented by analog signals whose information content must be exploited.

SUMMARY OF THE INVENTION

An object of the invention is to provide a system for spatial analysis of a physical quantity of the generic type indicated above which further refines the pertinence of the information, where its pertinence may be defined by predetermined criteria that the user of the sensor can easily apply selectively.

The invention therefore consists in a system for spatial analysis of a physical quantity whose spatial values are respectively represented by measurement pulses whose order in time is representative of those values, this system comprising a plurality of processing units for processing said measurement pulses, said processing units being arranged in one or more rows and each having an output at which, during successive processing cycles, a measurement pulse that is processed therein may be delivered to form the output signal of said system, characterized in that each of said processing units further includes inhibition means for inhibiting, in other units of said row and during a processing cycle, the passage toward the outputs of those other units of respective measurement pulses that are processed therein, and thereby preventing them from forming said output signal of the system, if those measurement pulses are ordered later in the processing cycle concerned than the pulse processed in the unit concerned.

Thanks to the above features, the analysis system provides at its output only information whose pertinence is judged to be the most meaningful for appropriate subsequent use of the information.

The analysis system of the invention may also have the following beneficial features:

- it further comprises means for counting the measurement pulses delivered at the output of said system over a plurality of successive processing cycles and for interrupting the processing of said measurement pulses if the number of pulses delivered in this way reaches a predetermined value;
- said spatial values representing said physical quantity are instantaneous amplitudes thereof measured locally during respective successive processing cycles, and each of said units further comprises conversion means for converting said amplitudes into measurement pulses ordered in time;
- said conversion means include control means that bring about the passage to the output of said measurement pulse in the processing unit of said row in which the order in time of that measurement pulse is the earliest in said cycle concerned and therefore represents the maximum value of the values of the physical quantity detected by the respective processing units during a processing cycle;
- said conversion means include control means that bring about the passage to the output of said measurement pulse in the processing unit in said row in which that pulse is the latest in said cycle concerned and therefore represents the minimum value of all the values of the physical quantity detected by the respective processing units during a processing cycle;
- said control means include a comparator to which is applied, on the one hand, the amplitude appearing in the processing unit concerned during a processing cycle and, on the other hand, a generator of a reference signal variable in accordance with a profile repeated during each processing cycle; said comparator being adapted to supply an inhibition signal to said adjacent units if said reference signal becomes equal to said amplitude during a processing cycle;
- said reference signal generator is adapted to generate a monotonously increasing reference signal and said measurement pulse corresponds to the lowest spatial value of said physical quantity during a processing cycle;
- said reference signal generator reference signal is adapted to generate a monotonously decreasing reference signal and said measurement pulse corresponds to the highest spatial value of said physical quantity during a processing cycle;
- it includes a plurality of rows of processing units forming a matrix, said units being arranged in rows and in columns, and each processing unit further comprises selection means for bringing about the selective inhibition of the passage toward the output of respective measurement pulses in the units adjacent the processing unit concerned, oriented in the direction of a column, a row or a diagonal of said matrix;
- each of said processing units comprises a turning filter circuit to which said amplitude is applied to form a vectorial signal whose norm is represented by the order of said measurement pulse and whose phase represents the orientation of the spatial variation of said physical quantity, said selection means further comprising means for comparing the phase of said vectorial signal to the order in time of said pulse and for authorizing, as a function of the phase position of said measurement pulse, the inhibition of the processing units selectively situated in a column, a row or a diagonal of said matrix;

said selection means further comprise means for selectively authorizing the passage to said output of the processing unit concerned of the measurement pulse that is processed therein or of the phase information of that pulse;

each processing unit is connected to an element responsive to said physical quantity and supplying an analog signal representative of the local evolution thereof and forming said amplitudes during said successive processing cycles;

said physical quantity is the luminance emanating from a scene observed by said system and said sensitive element is a photosensor forming part of each of said processing units.

BRIEF DESCRIPTION OF THE DRAWINGS

Other features and advantages of the present invention will become apparent in the course of the following description, which is given by way of example only and with reference to the appended drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
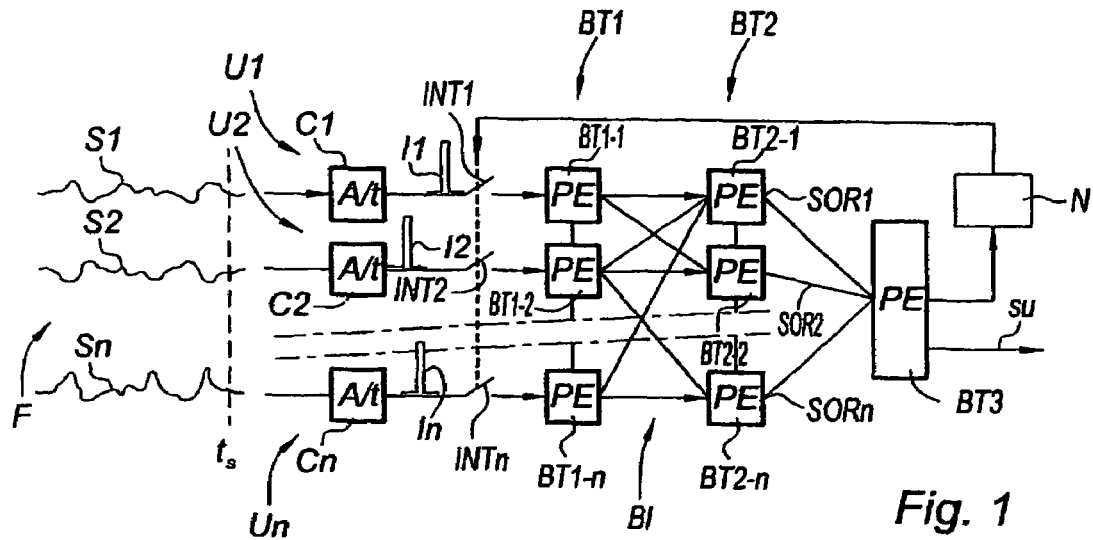
FIG. 1 is a highly simplified diagram of a spatial analysis system of the invention.

FIG. 1 shows by way of example a stream F of signals S1, S2, . . . , Sn collectively representing an observed phenomenon that may be reflected in the spatial evolution of a physical quantity specific to that phenomenon. The signals are applied to an analysis system of the invention of which FIG. 1 is a block diagram. One nonlimiting example of this is a group of analog signals produced by a matrix of processing units forming part of a photosensor (not shown). This kind of sensor may be used in a reader recognizing characters of a text message, for example. It is to be noted that in a more general context of the invention, the signals reflecting the spatial physical quantity may be represented by pulses whose position in time relative to each other reflects the pertinence of the information that these signals represent.

However, in FIG. 1 the signals S1 to Sn are analog signals and are applied to respective amplitude-time converters C1 to Cn that deliver a measurement pulse I1 to In when the amplitude of the analog signal satisfies a predetermined criterion, for example, when the signal passes through a given threshold value. Converters of this kind are known in the art and described in EP 1 150 250 in the name of the applicant of the present patent application, for example.

Thus the order in time is reflected in a spreading in time of the measurement pulses such that they appear in the time order in which the analog signals pass through said given threshold value. The amplitude-time converters C1 to Cn are part of respective processing units U1 to Un. They deliver respective measurement pulses that are applied to first processing units BT1-1 to BT1-$n$ in which they may be subjected to appropriate processing that is not described here. The first processing units then transmit the processed signals to second processing units BT2-1 to BT2-$n$ which effect another appropriate process. However, the transmission of these signals is subordinate to an inhibition procedure symbolized by the crossover connections forming an inhibition barrier BI, with the result that only information judged to be pertinent reaches the processing units BT2-1 to BT2-$n$. For example, it may be envisaged that the inhibition barrier allows to pass to the second set of processing units BT2-1 to BT2-$n$ only the pulse representing the passage through a spatial maximum of the analog signal from which it is derived.

It is to be noted that the processing units U1 to Un, which may comprise more than two levels (or layers) of processing units, execute synchronously with the other units consecutive cycles during each of which they analyze an analog signal sample that is applied to them.

The outputs SOR1 to SORn of the second processing units BT2-1 to BT2-$n$, which are those of the corresponding processing units, are applied collectively to a single third processing unit BT3 that applies a final treatment to only those pulses that have passed the inhibition barrier BI represented by the interconnections between the first and second processing units. The output of this third processing unit BT3 delivers the wanted signal at a terminal SU of the system at the end of each cycle of the processing units U1 to Un. The successive occurrences of these wanted signals may be counted in a counter N which can, when it reaches a predetermined position, command interruption of the transmission of pulses from the converters C1 to Cn, the number counted in the counter then being representative of the fact that enough wanted signals have been delivered to be processed effectively. The interruption may be effected by a set of switches INT1 to INTn implemented by any appropriate means.

The system that has just been described illustrates the basic concept of the invention, whereby a signal (one pulse from the pulses I1 to In) preceding other signals (the other pulses) is able to exert an action on the latter, even though those other signals have not yet appeared, by way of an inhibition (the inhibition barrier BI). This calculation principle based on the absence of less pertinent signals achieves a noteworthy simplification. Moreover, from an energy point of view, it is more economic to apply an action to a signal that has not yet appeared than to a signal that is already present, and may even result in more rapid convergence of the results.

More generally, in a system with multiple layers (here BT1, BT2 and BT3), as just described, the ordering in time enables control of the stream of information as a function of intermediate or final results.

In the application to character recognition already referred to in the preamble, it has been shown that recognition can be achieved using only 5 to 10% of the information contained in the image captured by the analysis system. Thanks to the concept of the invention as just explained with reference to FIG. 1, the final layer can inhibit the first layer of the system (processing units BT1-1 to BT1-$n$) as soon as a character is recognized, which avoids processing 90 to 95% of the signals. Power consumption can therefore be reduced, and the circuitry can even be simplified. Persons skilled in the art will understand that this concept may be applied each time that an observed phenomenon is reflected in the generation of a stream of signals whose information content must be exploited.

There is described next in more detail an application of the general concept just explained to the ordering in time of a set of values of a physical quantity, those values being detected by a sensor comprising a plurality of processing units responsive to that physical quantity. For convenience, the processing units are referred to as "pixels" in the remainder of the description, although they do not necessarily have any relationship to an optical phenomenon in the imaging field, for which the term "pixel" is generally reserved. It will further be assumed that these pixels may be arranged in the sensor either in a unidimensional arrangement, in which case they are disposed in a row, or in a bidimensional arrangement forming a plane matrix.

In a practical situation in which the invention is particularly useful, the spatially evolving physical quantity is the luminance coming from a scene observed by the sensor which, in this case, captures images of the scene during successive image capture cycles. This situation is described hereinafter by way of a nonlimiting example of an application of the invention. In this specific example, the sensor therefore comprises photosensitive pixels or processing units $p_n$ arranged in a row or in a matrix. Each pixel is capable of supplying local information on the luminance of the scene observed by the sensor. The information collected is processed and ordered in time for subsequent use in a known manner that forms no part of the invention and is therefore not described in detail here.

Figure 2:
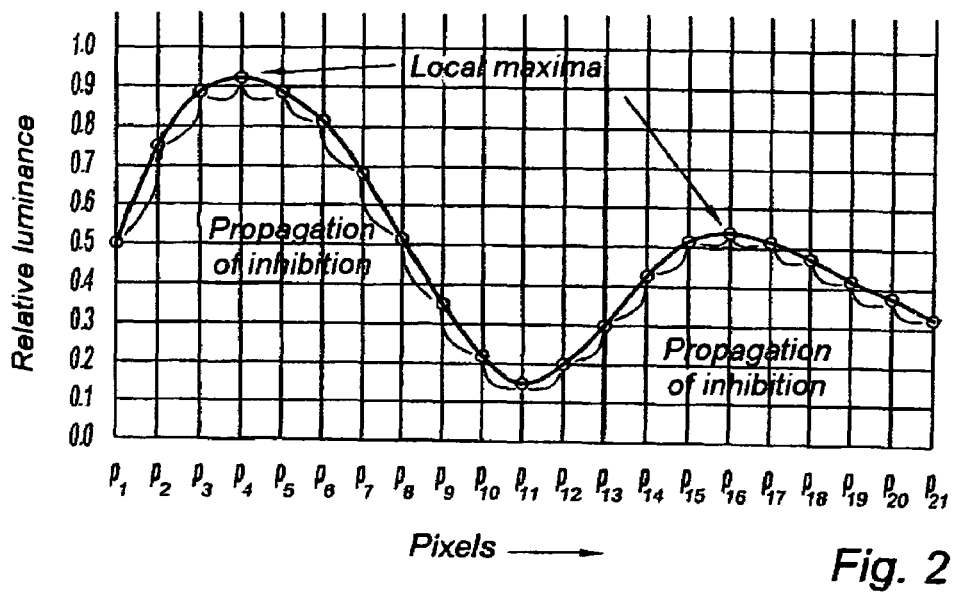
FIG. 2 is a graph showing values of a physical quantity detectable by processing units of the analysis system of the invention during a measurement cycle, when those units are arranged in a row.

FIG. 2 is a graph showing the luminance values that may be detected during an image capture cycle by the pixels of a bidimensional photosensor comprising 21 pixels $p_1$ to $p_{21}$, for example. It may be seen that the set of luminance values captured, in other words the spatial profile of the physical quantity consisting of the luminance, comprises two local maxima captured by the pixels $p_4$ and $p_{16}$, respectively, the values of these maxima being different. The figure also indicates that, according to the concepts of the invention, detecting the maxima at the pixels $p_4$ and $p_{16}$ leads, during the image capture cycle concerned, to the inhibition of the other pixels of the sensor, the inhibition instruction propagating progressively from the pixels $p_4$ and $p_{16}$ to their neighbors in both possible directions. It will become apparent hereinafter that it is equally possible to detect minima of the luminance values.

Figure 3:
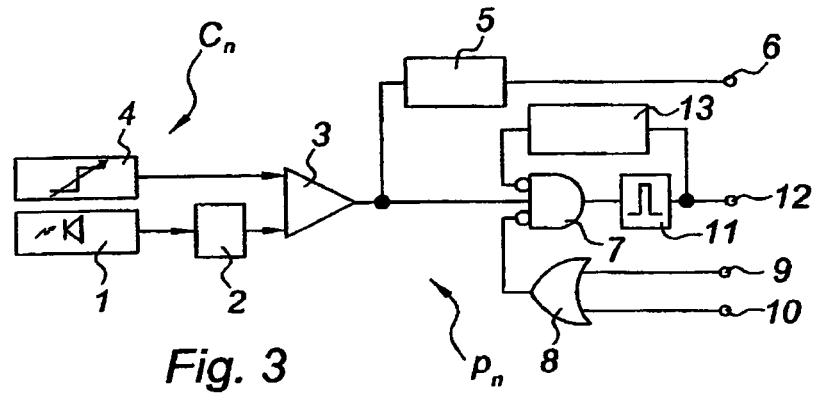
FIG. 3 is a simplified diagram of a processing unit of the analysis system of the invention constituting, by way of example, a unidimensional photosensor whose processing units are arranged in a row, the physical quantity being the luminance emanating from a scene observed by the sensor.

Refer now to FIG. 3, which is a functional block diagram of a preferred embodiment of any pixel $p_n$ of a unidimensional sensor in which all the pixels have exactly the same structure and are arranged in a row.

The local luminance emanating from the observed scene and captured by the pixel $p_n$ is detected by a photosensitive component 1, for example a photodiode, and stored in a sample and hold storage element 2. The resulting signal is applied to a first input of a comparator 3 whose other input is connected to the output of a threshold generator 4 whose output takes the form of a signal that varies in a predetermined fashion. This variation is the same during each image capture cycle of the sensor.

The output of the comparator 3 is connected to an inhibition activation unit 5 for sending an inhibition signal to the pixels $p_{n-1}$ and $p_{n+1}$ adjacent the pixel $p_n$ in the row of pixels of the sensor. This inhibition signal appears at an output terminal 6 of the pixel.

The output of the comparator 3 is also connected to a first input of an AND gate 7. This receives at a complemented second input the output of an OR gate 8 whose two inputs 9 and 10 are connected to the outputs 6 of respective pixels $p_{n-1}$ and $p_{n+1}$. The output of the AND gate 7 is connected to a pulse generator 11 that is triggered when the AND gate 7 is open. In this case, it delivers an output pulse of the pixel at an output 12 thereof that is also connected to an inhibition unit 13 adapted to deliver to a complemented third input of the AND gate 7 an inhibition command pulse starting from the time during an image capture cycle at which the AND gate 7 delivers a command pulse to the pulse generator 11.

To describe the functioning of this pixel, it is assumed that the information obtained from the pixels of the sensor must be ordered in time by decreasing amplitude.

To reset the sensor at the start of each image capture cycle, the threshold generator 4, which may be common to all the pixels, is set up so that it delivers the maximum threshold value. The inhibition unit 5 is initialized to its inactive state by default.

The threshold value delivered by the threshold generator 4 is then progressively decremented. Assuming that during the image cycle concerned the pixel $p_n$ receives the greatest quantity of light compared to those received by its neighbors, its comparator 3 will trip first, as soon as the values of the signals that are applied to it are equal. The output of the comparator 3 changes state and commands the inhibition unit 5 to block the delivery of an output pulse by the adjacent pixels $p_n-1$ and $p_n+1$. The AND gate 7 is open (no inhibition signal is received at the input 9 or 10 of the pixel $p_n$) and the pulse generator 11 delivers an output pulse at the terminal 12. The time during the image capture cycle at which this pulse appears at the output 12 is a function of the luminance value captured by the pixel $p_n$, in this instance a local maximum value. At the same time, by virtue of the inhibition unit 13, the pixel $p_n$ is prevented from delivering any new output pulse during the image cycle concerned.

The threshold generator 4 further reducing its output signal, the comparators 3 of the adjacent pixels $p_{n-1}$ and $p_{n+1}$, which have received the inhibition signal from the pixel $p_n$, trip in turn, but in this case these pixels are not able to send a pulse to their output 12, because their AND gate 7 is closed. However, the inhibition units 5 nevertheless inhibit the subsequent pixels $p_{n-2}$ and $p_{n+2}$. In this way the inhibition propagates from pixel to pixel until a minimum luminance value is achieved, where appropriate. This is the case of the pixel $p_{11}$ represented in FIG. 2, for example.

When the threshold value reaches its intended minimum value, only the pixels to which there correspond local luminance maxima have delivered a pulse to their output terminal, each pulse having appeared as a function of the relative value of that maximum and therefore temporally coding that value. In the FIG. 2 example, these pulses are delivered by the pixels $p_4$ and $p_{16}$.

In the mode of operation just described, the threshold value delivered by the unit 4 decreases monotonously during the image capture cycle, in which case the most pertinent information is that carried by the local maximum amplitudes of the magnitude that represents that information (the luminance in the example considered here).

However, in one variant of the invention, it is possible to order the information by increasing size. In this case, the threshold value delivered by the unit 4 increases monotonously during each image capture cycle so that only the pulses corresponding to local minima are delivered by the pixels concerned. The inhibition then propagates in the opposite direction. Moreover, in contrast to the example described hereinabove, the information corresponding to the lowest local maximum then precedes each time that or those corresponding to stronger local maxima.

In another variant, it is possible to assign to the value of the signal delivered by the generator 4 a variation different from a monotonous curve, whereby the most pertinent information could be determined in accordance with a criteria other than that of being a maximum or a minimum. Thus the invention provides a very simple way of establishing this criterion.

It will also be noted that, differing from the concept described with reference to FIG. 1, in which the inhibition barrier BI simultaneously inhibits all of the processing units U1 to Un, in FIG. 3, the inhibition propagates from pixel to pixel during the measurement cycle concerned (see FIG. 2).

The example described hereinabove relates to a unidimensional array of pixels. However, in a different embodiment of the invention, it is equally possible to order information in time in the case of a bidimensional array of pixels, on the understanding that, in this situation also, the term "pixel" generally covers a set comprising a sensor of a measured magnitude and the associated circuits for processing the measured value, a particular instance again being that in which the pixel detects the local luminance of a scene observed by the bidimensional array of pixels.

In the case of a bidimensional array of this kind, the information (such as the gradient, or spatial derivative, of the luminance whose components are the amplitude and the phase) is vectorial, with the result that it is necessary to determine another criterion for ordering the information. To be more precise, that criterion must define in which directions it is necessary to propagate the inhibition of the pixels adjacent any pixel $p_n$ concerned in the array.

Figure 4:
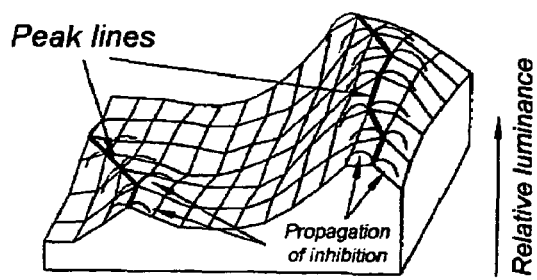
FIG. 4 is a graph showing the values of the physical quantity detectable by the processor units of the analysis system of the invention during a measurement cycle, when those units are arranged in a bidimensional matrix.
Figure 5A:
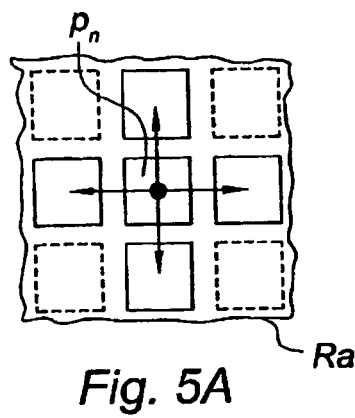
FIGS. 5A and 5B show diagrammatically two ways of propagating inhibition among the processing units of a bidimensional matrix of processing units.
Figure 5B:
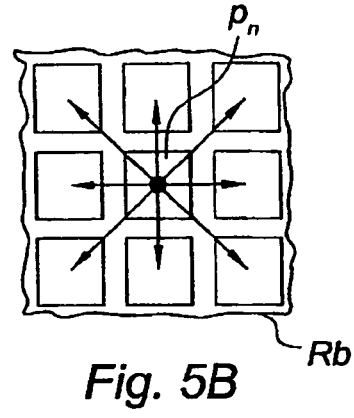

FIG. 4 is a diagram analogous to that of FIG. 2, but extended to two dimensions, the measured physical quantity being captured by a bidimensional matrix of pixels. It can be seen that, in the example represented, the diagram features two "peak lines" plotted over the local maxima generated by the pixels. The diagram also shows approximately how the inhibition may propagate from pixel to pixel in the matrix. FIGS. 5A and 5B show two typical cases of criteria that may be envisaged. In FIG. 5A, the inhibition is propagated from a pixel $p_n$ of a matrix Ra only to the adjacent pixels situated on the horizontal and vertical axes defined in that matrix, whereas in FIG. 5B there is, in addition to that propagation, propagation in the direction of the diagonals of the matrix, here denoted Rb.

Moreover, the pertinent information generally being carried by the norm of the vector, it is the norm that is used to order the maxima in time. Once again, this ordering may be effected in increasing or decreasing amplitude order, by analogy with the foregoing disclosure in respect of unidimensional arrays.

One embodiment of a pixel of a matrix operating in accordance with the principle shown in FIG. 5A is described next with reference to FIG. 6, as applied to the situation in which the physical quantity is the measured luminance coming from a scene observed by the array, so that the pixels again comprise photosensors for detecting light coming from the scene. As in FIG. 3, all the pixels of the matrix have the same circuit configuration.

The local luminance information is detected by a photosensitive component 20 such as a diode whose output signal is processed in a "turning filter" conversion circuit 21 in which the vectorial information is time-modulated using a sinusoidal function. This kind of circuit is described in detail in the European patent application cited above.

The sinusoidal signal coming from the conversion circuit 21 is applied via a sample and hold circuit 22 for detecting the maximum and storing this value to a first input of a comparator 23 whose other input is connected to a variable threshold circuit 24 that may be common to all of the pixels. The output of this comparator 23 is connected to an inhibition activation unit 25, to the first input of an AND gate 26, and to a first input of a multiplexer 27.

The output of the conversion circuit 21 is also connected to a first input of a comparator 28 whose other input is connected to a generator 29 of a null reference voltage. The output of this comparator 28 is connected to a pulse former 30 whose output is connected firstly to the second output of the AND gate 26 and secondly to the "store" command input of a memory 31 comprising two cells 31a and 31b. These cells are for temporarily storing respective horizontal and vertical preselection commands received via respective inputs 32a and 32b. The contents of these memory cells appear on respective outputs 33a and 33b that are the first inputs of respective AND gates 34a and 34b. The other two inputs of the latter gates are connected together and to the output of the inhibition activation unit 25. The outputs 35a and 35b of the AND gates 34a and 34b constitute the respective inhibition commands of the horizontal, respectively vertical, pixels adjacent the pixel $p_n$ concerned.

The output of the AND gate 26 is connected to the other input of the multiplexer 27. The latter may be controlled via a control input 36 to select ordering information relating either to the norm or to the orientation of the input vector of the pixel $p_n$.

The output of the multiplexer 27 is connected to one input of an AND gate 37 having a complemented input receiving the output of an OR gate 38. The inputs 39a to 39d are connected to horizontal or vertical adjacent pixels to receive the inhibition signals 35a and 35b from them, where applicable. The last input of the AND gate 37 is connected to an inhibition unit 40 whose input is connected to a pulse generator 41 controlled by the output of the AND gate 37. The node corresponding to the output of the generator 41 and to the input of the unit 40 constitutes the output 42 of the pixel.

Figure 7:
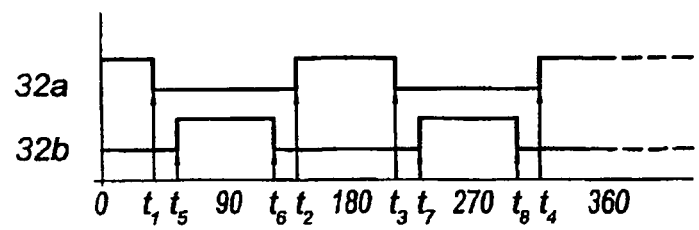
FIG. 7 is a timing diagram showing the waveform of two signals that may be used in the processing unit represented in FIG. 6.

FIG. 7 is a diagram representing the signals applied to the respective input 32a and 32b of the memory cells 31a and 31b. These signals are prepared in a control unit of the pixel (not shown in the drawings). The times of the rising and falling edges of these signals are preferably adjustable.

Figure 6:
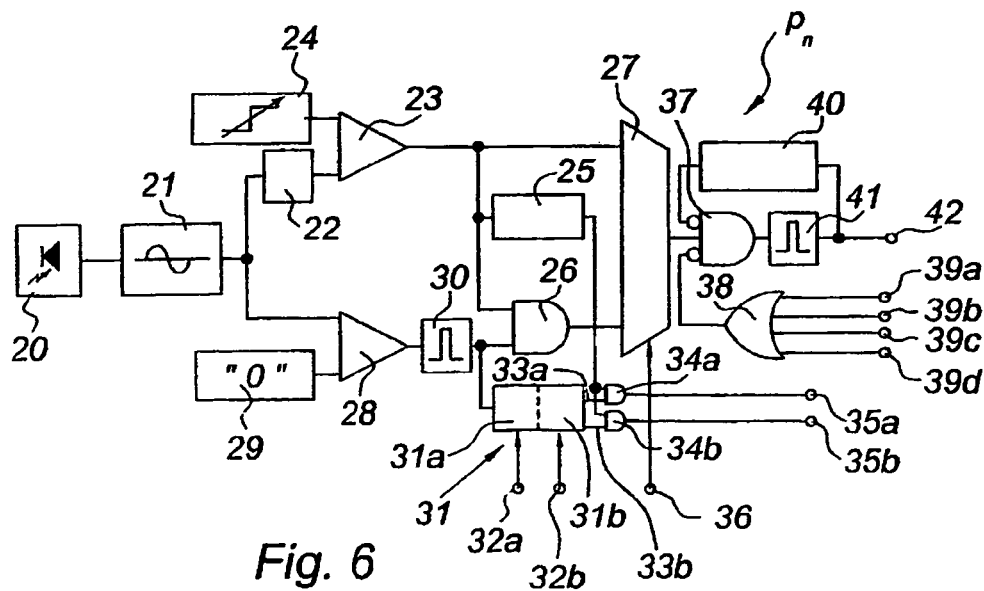
FIG. 6 is a simplified diagram of a processing unit of a bidimensional matrix of the invention.

The functioning of the pixel represented in FIG. 6 is described next in the light of the signal shapes represented in FIG. 7.

At the start of each signal acquisition cycle, the memory cells 31a and 31b are initialized with low level signals.

During the first period of the sinusoid representing the wanted signal and generated by means of turning filters, the threshold established by the unit 24 is maintained at its maximum level so that the comparator 23 cannot trip, the maximum amplitude of the wanted signal being below this threshold. However, the comparator 28 compares the evolution of the wanted signal at a null level to that on the first zero crossing of the wanted signal the comparator 28 trips, which is representative of a predetermined phase angle. In the case of an image capture application using a photosensitive array, this angle corresponds to a direction orthogonal to the orientation of a luminous contour observed by the pixel in the image captured by the photosensor (for example for character recognition).

When the comparator 28 trips, a "store" command signal is applied to the memory cells 31a and 32b so that the current states of the FIG. 7 signals are stored therein. If, at this time, the horizontal inhibition preselection signal at the terminal 32a is high, the corresponding value is stored in the cell 31a; in the example considered here, this means that the contour observed by the pixel concerned is situated in a vertical angular sector and that the inhibition must propagate to the adjacent pixels in a horizontal direction. On the other hand, if at this time the vertical inhibition preselection signal at the terminal 32b is high, the corresponding value is stored in the memory cell 31b; this means that the contour observed by the pixel concerned is situated in a horizontal angular sector and that the inhibition must propagate to the adjacent pixels in a vertical direction.

Involving the eight neighbors of the pixel concerned in the inhibition mechanism may be envisaged, as shown in the FIG. 5B diagram. In this case, it is necessary to provide four inhibition preselection signals respectively corresponding to the following inhibition preselections: horizontal, vertical, 135°-315° diagonal, and 45°-225° diagonal. It also requires four memory cells and a corresponding complication of the remainder of the circuit of the pixel.

As soon as the inhibition preselection is determined in the manner just described, the threshold generator 24 delivers a threshold value decreasing from its maximum value. The first pixel of the array, for which the norm of the wanted signal becomes equal to the threshold, represents a local maximum. As a function of the state selected for the multiplexer 27 by the command at the terminal 36, there is sensed either a pulse corresponding to the norm of the vector of the wanted signal or a pulse corresponding to the orientation during the next "rotation" cycle of the vector.

As soon as this pulse is sensed, subsequent sending of pulses is prevented by the unit 40.

Following tripping of the comparator 23, the pixel concerned activates the mechanism for inhibiting adjacent pixels via the AND gate 34a or 34b, and the inhibition propagates in the preselected direction in the memory cell 31a or 31b concerned.

While the above operations are in progress, the threshold circuit 24 decrements the threshold value. As soon as that value reaches the value of the norm of the vector of a pixel to which the inhibition relates, the latter attempts to send to its output terminal 42 a pulse representative of the time of equality with the threshold, but the presence of the inhibition information coming from an adjacent pixel at one of the inputs 39a to 39d of its OR gate 38 prevents this sending.

However, the inhibition information continues to be propagated from one adjacent pixel to another until it reaches a pixel that has also been inhibited by another pixel (this is what happens in FIG. 2 in the case of the pixel $p_{11}$). It will be noted that, in practice, the inhibition always propagates both ways in a given direction, regardless of the pixel concerned, i.e. it is also propagated toward the preceding pixel. However, as the latter has already sent a pulse, its inhibition circuit is already activated, and it can therefore no longer send. The inhibition information that is sent to it therefore has no effect.

Figure 8:
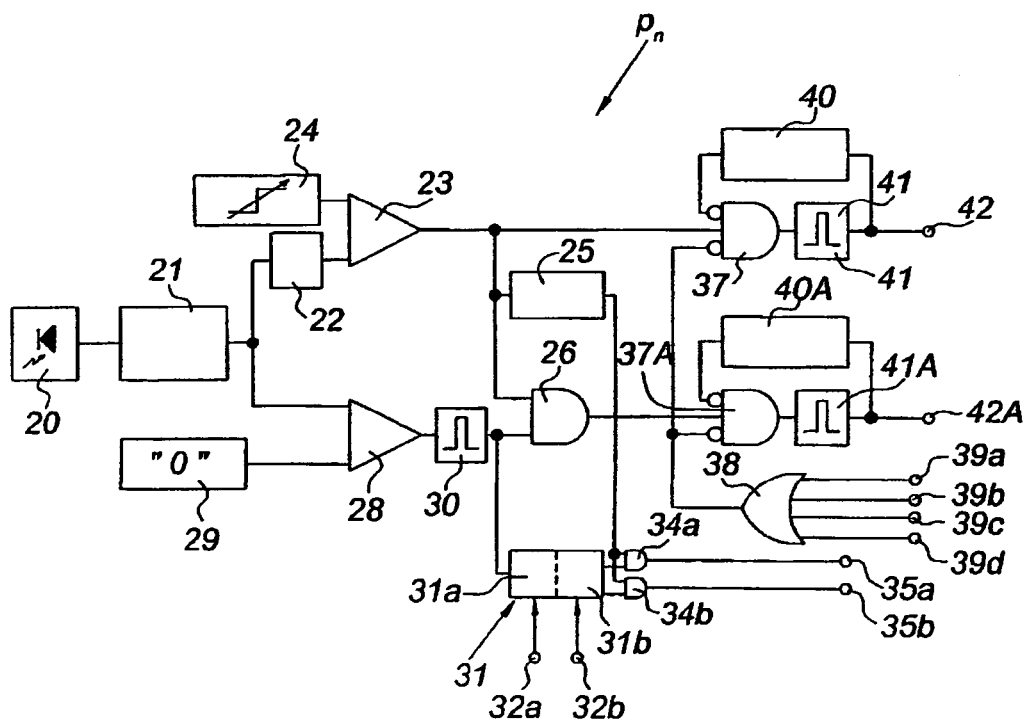
FIG. 8 is a simplified diagram of a processing unit for a bidimensional matrix of a variant of the invention.

FIG. 8 represents a variant of the diagram of the pixel represented in FIG. 6. In this case, the functions of the units 37, 40 and 42 are duplicated by units 37A, 40A and 41A so that instead of one information item per image capture cycle there may be two, namely a pulse representing the norm of the vector and a pulse representing its phase. According to a variant that is not shown in FIG. 8, subject to the provision of a few logic units whose implementation will be obvious to the person skilled in the art, it is possible to determine to which information the inhibition applies (the norm or the angle of the vector).

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A system for spatial analysis of a physical quantity whose spatial values (S1 to Sn) are respectively represented by measurement pulses (I1 to In) whose order in time is representative of those values, said system comprising a plurality of processing units (U1 to Un; $p_n$) for processing said measurement pulses, said processing units being arranged in one or more rows and each having an output (SOR1 to SORn) at which, during successive processing cycles, a measurement pulse that is processed therein is delivered to form an output signal (SU) of said system, wherein each of said processing units (U1 to Un; $p_n$) further includes an inhibition unit (BI) for inhibiting, in other units of said one or more rows and during a processing cycle, passage toward the outputs (SOR1 to SORn) of those other units of respective measurement pulses that are processed therein, and thereby preventing said respective measurement pulses from forming said output signal (SU) of the system, if those measurement pulses are ordered later in the processing cycle concerned than the pulse processed in the unit concerned.

2. The system according to claim 1, further comprising a counter (N) for counting the measurement pulses delivered at the output (SU) of said system over a plurality of successive processing cycles and for interrupting (INT1 to INTn) the processing of said measurement pulses if the number of pulses delivered in this way reaches a predetermined value.

3. The system according to claim 1, wherein said spatial values (S1 to Sn) representing said physical quantity are instantaneous amplitudes thereof measured locally during respective successive processing cycles, and each of said units (U1 to Un; $p_n$) further includes a converter (C1 to Cn) for converting said amplitudes into measurement pulses (I1 to In) ordered in time.

4. The system according to claim 3, wherein said converter includes a control element that brings about the passage to the output of said measurement pulse in the processing unit of said row in which the order in time of that measurement pulse is the earliest in said cycle concerned and therefore represents the maximum value of the values of the physical quantity detected by the respective processing units ($p_n$) during a processing cycle.

5. The system according to claim 3, wherein said converter includes a control element that brings about the passage to the output of said measurement pulse in the processing unit in said row in which that pulse is the latest in said cycle concerned and therefore represents the minimum value of all the values of the physical quantity detected by the respective processing units (pa) during a processing cycle.

6. The system according to claim 4, wherein said control element includes a comparator to which is applied, on the one hand, the amplitude appearing in the processing unit (U1 to Un; $p_n$) concerned during a processing cycle and, on the other hand, a generator of a reference signal variable in accordance with a profile repeated during each processing cycle; said comparator being adapted to supply an inhibition signal to said adjacent units if said reference signal becomes equal to said amplitude during a processing cycle.

7. The system according to claim 6, wherein said reference signal generator is adapted to generate a monotonously increasing reference signal and said measurement pulse corresponds to the lowest spatial value of said physical quantity during a processing cycle.

8. The system according to claim 5, wherein said control element includes a comparator to which is applied, on the one hand, the amplitude appearing in the processing unit (U1 to Un; $p_n$) concerned during a processing cycle and, on the other hand, a generator of a reference signal variable in accordance with a profile repeated during each processing cycle; said comparator being adapted to supply an inhibition signal to said adjacent units if said reference signal becomes equal to said amplitude during a processing cycle and wherein said reference signal generator reference signal is adapted to generate a monotonously decreasing reference signal and said measurement pulse corresponds to the highest spatial value of said physical quantity during a processing cycle.

9. The system according to claim 1, wherein said system includes a plurality of rows of processing units ($p_n$) forming a matrix, said units being arranged in rows and in columns, and each processing unit further comprises a selector for bringing about the selective inhibition of the passage toward the output of respective measurement pulses in the units adjacent the processing unit concerned, oriented in the direction of a column, a row or a diagonal of said matrix.

10. The system according to claim 9, wherein each of said processing units ($p_n$) includes a turning filter circuit to which said amplitude is applied to form a vectorial signal whose norm is represented by the order of said measurement pulse and whose phase represents the orientation of the spatial variation of said physical quantity, said selector further comprising a comparator for comparing the phase of said vectorial signal to the order in time of said pulse and for authorizing, as a function of the phase position of said measurement pulse, the inhibition of the processing units selectively situated in a column, a row or a diagonal of said matrix.

11. The system according to claim 10, wherein said selector further includes a multiplexer for selectively authorizing the passage to said output of the processing unit concerned of the measurement pulse that is processed therein or of the phase information of that pulse.

12. The system according to claim 1, wherein each processing unit is connected to an element responsive to said physical quantity and supplying an analog signal representative of the local evolution thereof and forming said amplitudes during said successive processing cycles.

13. The system according to claim 12, wherein said physical quantity is the luminance emanating from a scene observed by said system and said sensitive element is a photosensor forming part of each of said processing units.

* * * * *